US009493203B2

(12) United States Patent
Portz (10) Patent No.: US 9,493,203 B2
(45) Date of Patent: Nov. 15, 2016

(54) BICYCLE SEAT (71) Applicant: Lyle Portz, Kelowna (CA)

(72) Inventor: Lyle Portz, Kelowna (CA)

(*) Notice: Subject to any disclaimer, the term of this patent is extended or adjusted under 35 U.S.C. 154(b) by 0 days.

(21) Appl. No.: 14/197,031

(22) Filed: Mar. 4, 2014

(65) Prior Publication Data

US 2015/0251717 A1 Sep. 10, 2015

(51) Int. Cl.
*A47C 7/14* (2006.01)
*B62J 1/00* (2006.01)
*B62J 1/08* (2006.01)

(52) U.S. Cl.
CPC ............ *B62J 1/005* (2013.01); *A47C 7/14* (2013.01); *B62J 1/00* (2013.01); *B62J 1/08* (2013.01)

(58) Field of Classification Search
CPC ............... A47C 7/14; B62J 1/00; B62J 1/08
USPC ........... 297/201, 195.11, 208, 209, 312, 337, 297/311, 195.1, 215, 200
See application file for complete search history.

(56) References Cited

U.S. PATENT DOCUMENTS

| 560,698 | A | * | 5/1896 | Dyer | B62J 1/005 |
| | | | | | 297/201 |
| 563,063 | A | | 6/1896 | Pullman | |
| 694,875 | A | * | 3/1902 | Meighan | B62J 1/005 |
| | | | | | 297/201 |
| 1,427,484 | A | | 8/1922 | Lawrence | |
| 2,188,153 | A | | 1/1940 | Mesinger | |
| 2,828,801 | A | | 4/1958 | Papst | |
| 3,104,129 | A | * | 9/1963 | Mack | B62J 1/00 |
| | | | | | 297/215.16 |
| 4,512,608 | A | * | 4/1985 | Erani | B62J 1/002 |
| | | | | | 297/195.12 |
| 5,167,435 | A | * | 12/1992 | Aldi | B62J 1/02 |
| | | | | | 297/201 |
| 5,294,174 | A | * | 3/1994 | Bigolin | B62J 1/02 |
| | | | | | 297/209 |
| 5,823,618 | A | * | 10/1998 | Fox | B62J 1/005 |
| | | | | | 297/195.1 |
| 5,863,094 | A | | 1/1999 | Endo | |
| 6,213,553 | B1 | * | 4/2001 | Fitz | A47C 9/002 |
| | | | | | 297/195.1 |
| 6,254,180 | B1 | | 7/2001 | Nelson | |
| 6,481,792 | B1 | * | 11/2002 | Goin | B62J 1/12 |
| | | | | | 297/195.13 |
| 7,178,869 | B2 | * | 2/2007 | Ljubich | B62J 1/00 |
| | | | | | 297/201 |
| 7,628,451 | B2 | * | 12/2009 | Chuang | 297/201 |
| 8,061,767 | B2 | | 11/2011 | Kunzler et al. | |
| 8,297,696 | B2 | * | 10/2012 | Chuang | B62J 1/005 |
| | | | | | 297/199 |
| 2001/0045765 | A1 | * | 11/2001 | Nelson | B62J 1/002 |
| | | | | | 297/201 |
| 2009/0039686 | A1 | * | 2/2009 | Selbekk | A47C 1/023 |
| | | | | | 297/63 |
| 2011/0210231 | A1 | | 9/2011 | D'Aluisio | |
| 2014/0265468 | A1 | * | 9/2014 | Greenhill | B62J 1/02 |
| | | | | | 297/208 |
| 2014/0375092 | A1 | * | 12/2014 | Curless | B62J 1/005 |
| | | | | | 297/201 |
| 2016/0068212 | A1 | * | 3/2016 | Hamel | B62J 1/007 |
| | | | | | 297/201 |

FOREIGN PATENT DOCUMENTS

DE 824607 12/1951
DE 202013009378 1/2014
(Continued)

*Primary Examiner* — Syed A Islam
(74) *Attorney, Agent, or Firm* — Richard D. Okimaw (57) ABSTRACT

An apparatus and method for supporting a bicycle rider. The apparatus comprises an elongate central member and first and second independently biased members each located to a lateral side of the central member. The method comprises providing an elongate central member and biasing first and second members to lateral sides of the central member.

14 Claims, 8 Drawing Sheets

(56) References Cited

FOREIGN PATENT DOCUMENTS

| | | |
|---|---|---|
| EP | 1658786 | 11/2005 |
| GB | 191324398 | 10/1918 |
| GB | 156979 | 1/1921 |
| GB | 190858 | 1/1923 |
| GB | 205025 | 10/1923 |
| GB | 433019 | 8/1935 |
| GB | 680504 | 10/1952 |
| WO | 2009040771 | 4/2009 |

* cited by examiner

BICYCLE SEAT

BACKGROUND OF THE INVENTION

1. Field of Invention

The present invention relates to bicycle seats in general and in particular to a method and apparatus for independently supporting each side of a user on a bicycle.

2. Description of Related Art

Bicycles are a common form of transportation for many people. In a conventional or upright form, a user sits upon a seat or saddle located at a distance above and between the two wheels and grasps a handlebar connected to the front wheel with his or her hands.

Traditionally, bicycle seats are formed of a unitary support member having a forward or nose portion which is narrowed to fit between a user's legs and a widened rear portion for supporting the buttocks of the user. The forward portion may be utilized by the user to provide stability while riding as well as to leverage against during peddling to increase peddling power. Padding or suspension is often provided to the unitary seat to improve rider comfort.

One difficulty experienced by many bicycle riders is that conventional bicycles can exert pressure on their perineum which may reduce blood flow leading to erectile dysfunction or numbness. Previous attempts to reduce this pressure on the perineum of the user have been to replace a conventional seat with a pair of seating pads which are each placed under one side of the buttocks of the user. An example of such seats is provided in U.S. Pat. No. 560,698 to Dyer. Disadvantageously, such seats do not provide any lateral stability to the rider which may reduce the stability that the rider may have as well as the power that the user may exert on the pedals.

SUMMARY OF THE INVENTION

According to a first embodiment of the present invention there is disclosed an apparatus for supporting a bicycle rider comprising an elongate central member and first and second independently biased members each located to a lateral side of the central member.

The first and second biased members may have a curved top surface. The top surface of the first and second biased members may be higher than a top surface of the central member. The first and second biased members may have an s-shaped profile. The first and second biased members may have a c-shaped profile. The first and second biased members may be formed of a material selected from the group consisting of metal, carbon fibre or plastic. The first and second biased members may include a padded member on a top surface thereof.

The apparatus may further comprise a base member for connecting the first and second biased members to the central member. The base member may comprise a transverse member.

The central member may include at least one connecting member extending along a bottom surface thereof, the at least one connecting member being selectably connectable to a bicycle post along a length of the at least one connecting member. The at least one connecting member may comprise a pair of spaced apart rods. The central member may have a width of between 1 and 4 inches. The central member may have a padded layer therearound.

According to a further embodiment of the present invention there is disclosed a method for supporting a bicycle rider comprising providing an elongate central member and biasing first and second members to opposed lateral sides of the central member.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
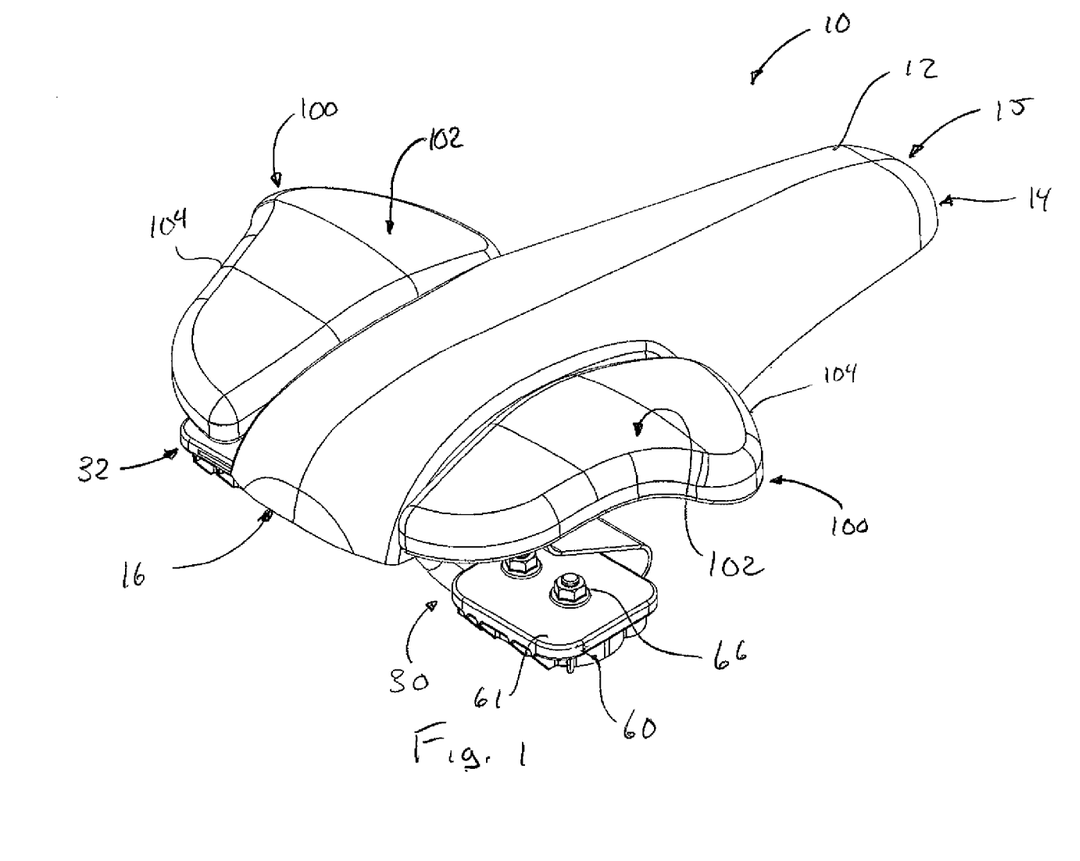
FIG. 1 is a perspective view of an apparatus according to a first embodiment of the present invention.

Referring to FIG. 1, an apparatus for supporting a bicycle rider according to a first embodiment of the invention is shown generally at 10. The apparatus 10 comprises a central member 12 extending along a length which is adapted to correspond to the length of a bicycle (not shown) as is conventionally known. The apparatus 10 includes first and second side biased members 30 and 32, respectively located to each side of the central member 12.

Figure 4:
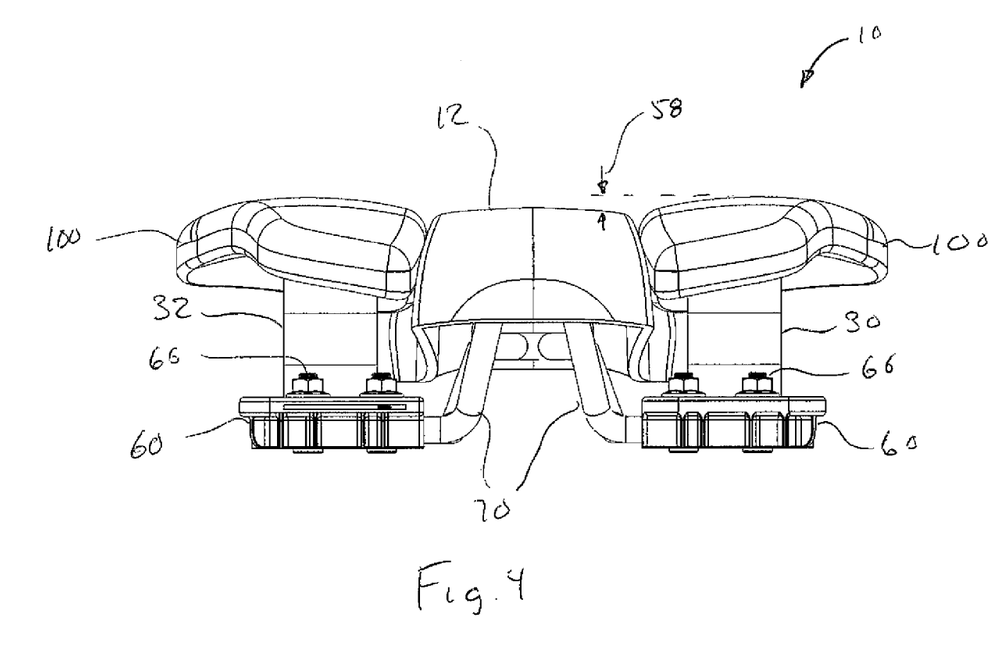
FIG. 4 is a rear view of the apparatus of FIG. 1.

The central member 12 comprises an elongate member extending between front and rear ends, 14 and 16, respectively with forward and rear portions 15 and 17, respectively proximate thereto. The central member has a shape adapted to fit between the legs of a rider and may have a length of between 6 to 10 inches (152 and 254 mm) between the front and rear ends 14 and 16 and a width of between 1 and 4 inches (25 and 102 mm). The central member 12 has a substantially cylindrical shape as illustrated and may be contoured as desired by a user. Additionally, as illustrated in FIG. 4, the central member 12 may be formed of a an inner rigid core 18, having one or more layers of padding or sheathing materials 20 thereover as is commonly known in the art.

Figure 2:
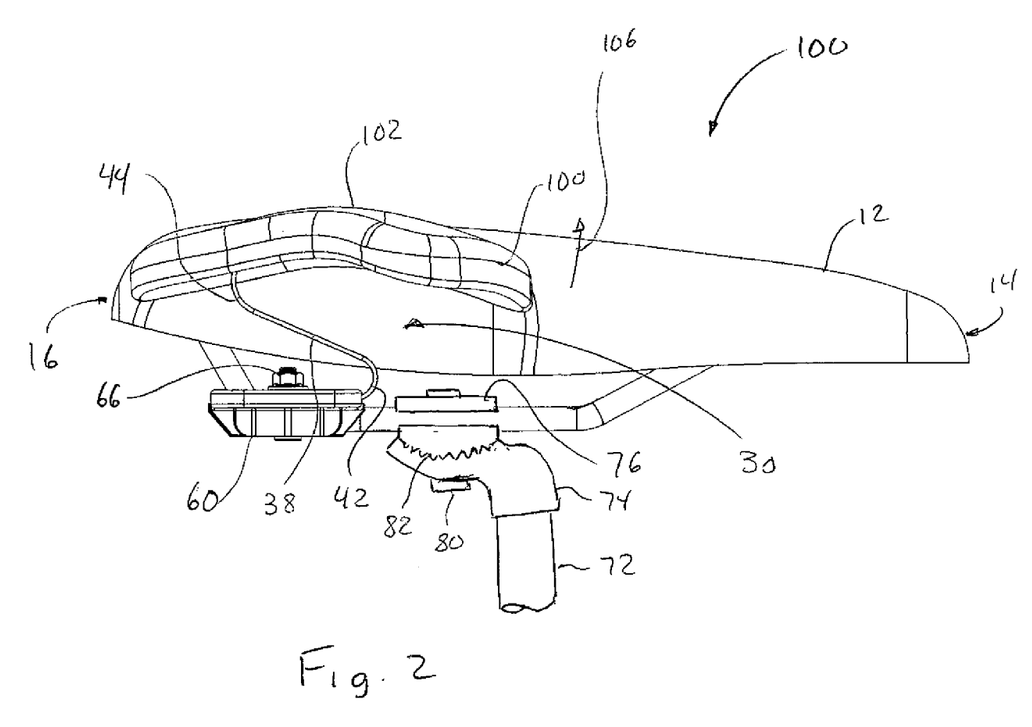
FIG. 2 is a side view of one of the biased side supports of the apparatus of FIG. 1.
Figure 6:
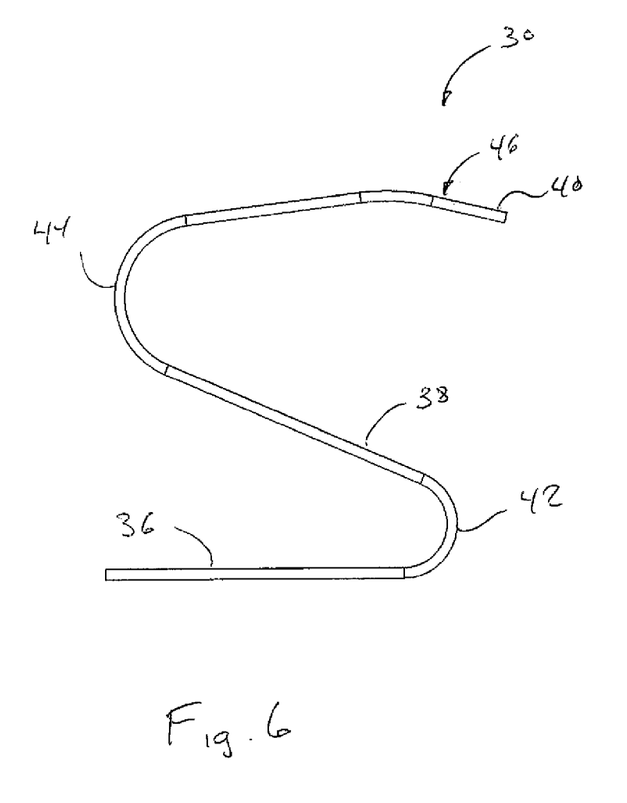
FIG. 6 is a side view of one of the biased side supports of the apparatus of FIG. 1.

As illustrated in FIG. 1, with reference to the first side biased member each of the first and second side biased members 30 and 32 are formed to provide a top surface 34 proximate to one side of the central member 12. In particular the first and second biased members 30 and 32 are positioned to be proximate to a rear portion 17 of the central member 12. As illustrated in FIGS. 2 and 6, the first and second biased members 30 and 32 may have an s-shape with a base portion 36, a middle portion 38 and a top portion 40. The base portion 36 and the middle portion 38 have a first bend 42 therebetween while the middle portion 38 and the top portion 40 have a second bend 44 therebetween. The top portion 40 includes a top surface 46 oriented in a substantially upward direction. The base portion 36 and middle portion 38 may be substantially planar while the top portion 40 has an arcuate shape the purpose of which will be more fully described below. As illustrated in FIG. 1, the top portion 40 may also include a leading edge 48 which may be square, rounded or any other desired shape.

Optionally, as illustrated in FIG. 1, the first and second side biased members 30 and 32 may include a padded member 100 located on the top thereof. The padded member 100 may be formed of any suitable material so as to provide cushioning to a user. The padded member includes a top surface 102 which may have a shape corresponding to the top portion 40.

Additionally the padded members 100 may have an outline 104 selected to provide adequate support for a user according to commonly known methods.

As illustrated in FIG. 6, the base portion, middle portion 38 and top portion may be formed of a continuous member which is bent in to the desired shape. In particular the first and second biased members 30 and 32 may each be formed of a strip of material such that the biased member has a substantially uniform width although non-uniform widths may also be used. The top portion 40 extends between inside and outside edges 50 and 52 and is selected to have a width between the first and second sides to be suitable to support one side of a user's buttocks. In particular, the width of the top portion 40 is selected to be between 1 and 3 inches (25 and 76 mm). The first and second side biased members 30 and 32 may be formed of any suitable material, such as, by way of non-limiting example, steel, stainless steel, aluminium, composite materials or plastic, provided that such material has the required degree of strength to support the weight of a user as well as elastically deform by a desired amount. Optionally, the first and second biased members 30 and 32 may be covered by one or more layers of padding or sheathing materials thereover as is commonly known in the art where the padded members are omitted. The top portions 40 of the first and second side biased members 30 and 32 are spaced apart by a spacing distance 54 selected to position the first and second biased members below the tuberosity of the ischium or sits bones of a user. In particular the spacing distance 54 may be selected to be between 1 and 4 inches (25 and 102 mm). Additionally, as illustrated in FIG. 4, the top of the top portions 40 is spaced above the central member by a riser distance generally indicated at 58. The riser distance 58 is selected to ensure that the weight of the rider is supported by the first and second side biased members 30 and 32 and not the central portion 12. In particular, the riser distance may be selected to be up to 0.4 inches (13 mm).

Figure 5:
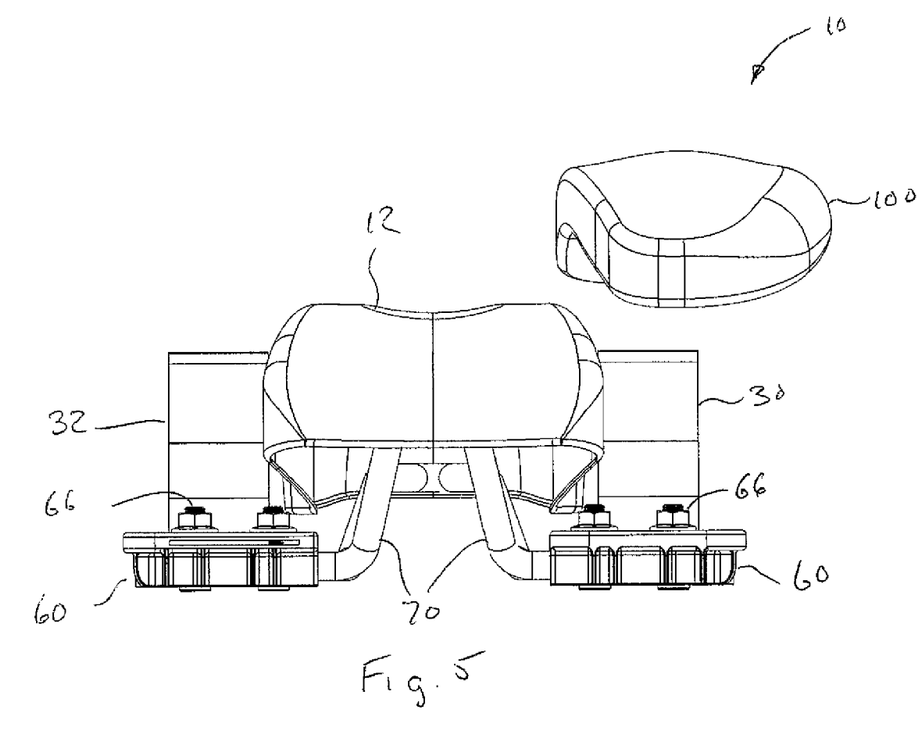
FIG. 5 is a rear view of the apparatus of FIG. 1 with one of the padded members being located above the biasing one of the biased members.
Figure 8:
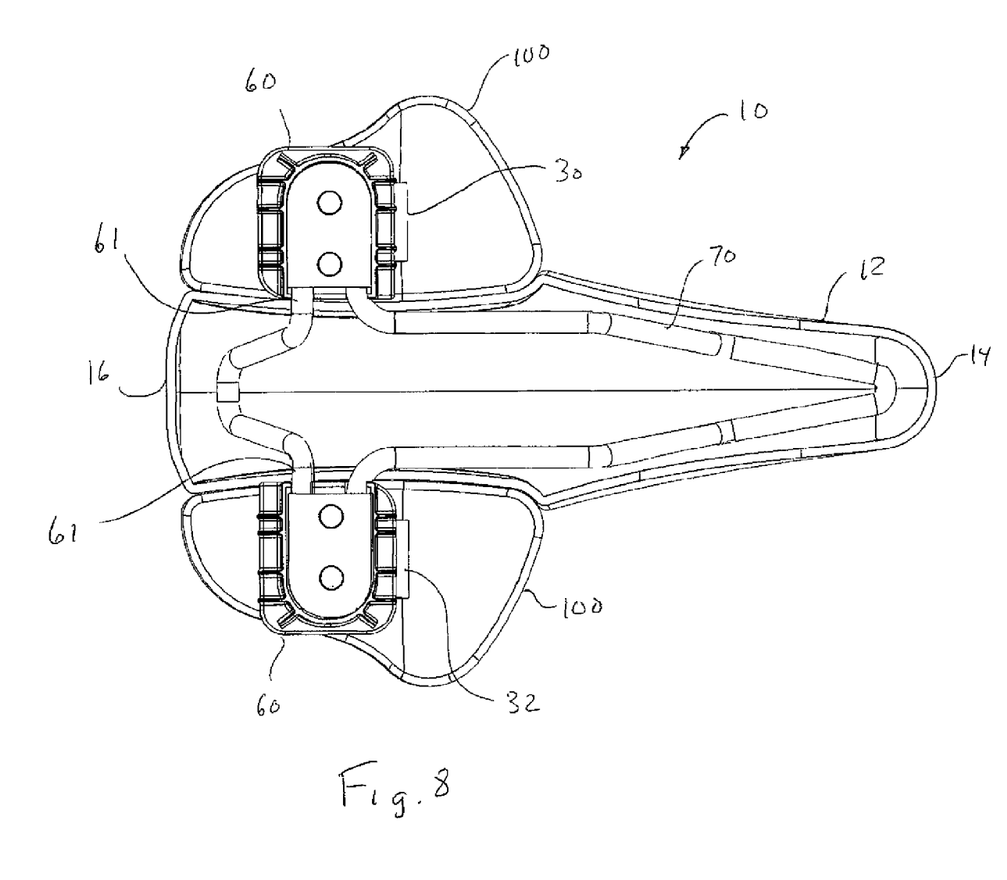
FIG. 8 is a bottom view of the apparatus of FIG. 1.

The first and second side biased members 30 and 32 are supported by a base members 60. With reference to FIGS. 4, 5 and 8, the base members 60 extends comprise bodies located to adjacent sides of the central member 12. As illustrated in FIG. 8 the base members are supported by side extension 61 in the seat rails 70 as further described below. Each base member 60 supports one of the first and second side biased members 30 or 32 thereupon. The first and second side portions 30 and 32 may be secured to the base members 60 by any suitable means, such as fasteners, such as bolts 66 as illustrated in FIGS. 4 and 5, adhesives welding or the like. Optionally, the base member 60 may have a plurality of mounting locations, such as a plurality of holes or a slot for securing the first and second side biased members 30 and 32 thereto at one of a plurality of locations to provide adjustability to a user. The base member 60 may be formed of any suitable material such as metal, composite materials or plastics provided such material provides sufficient strength to support the weight of a user upon the first and second side biased members 30 and 32.

Figure 3:
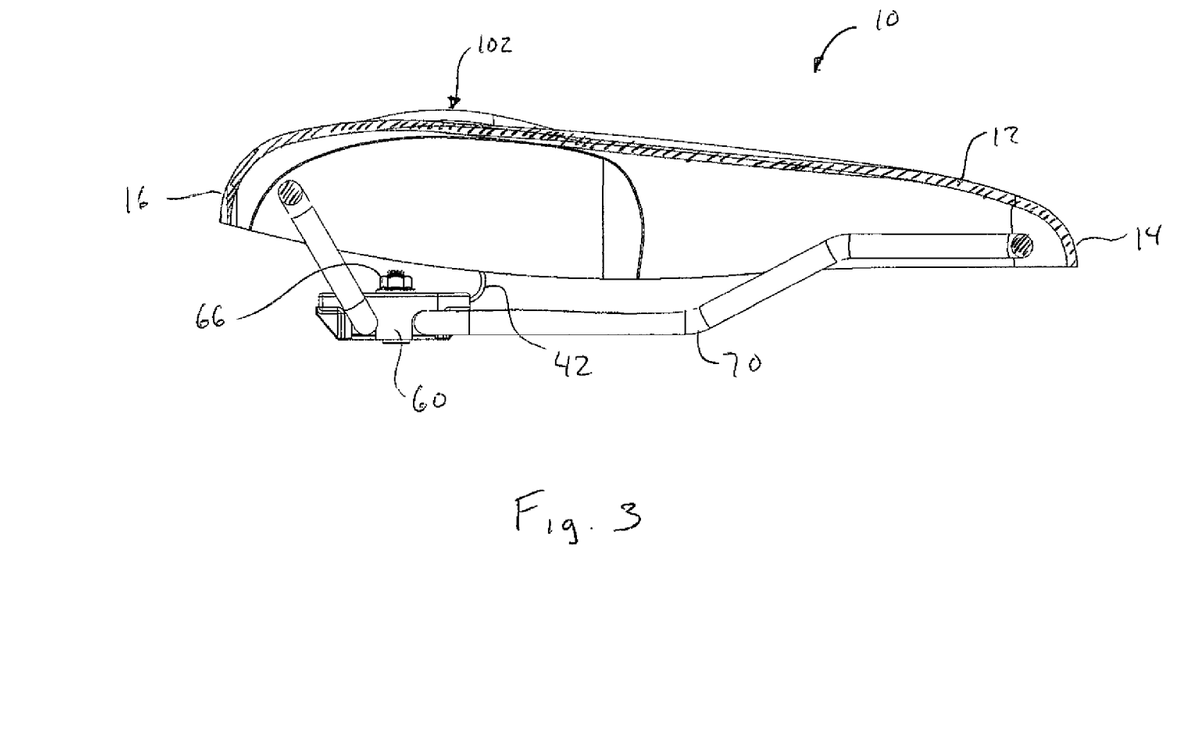
FIG. 3 is a cross-sectional view of the apparatus of FIG. 1 as taken along the line 1-1.

With reference to FIG. 3, the central member 12 may include at least one seat rail 70 extending along a bottom surface thereof. The seat rails 70 may be of a known type, such as a pair of parallel spaced apart rails as are commonly known. As illustrated in FIG. 8, the seat rails 70 may include bowed side portions 62 extending away from each other to support the base members 60. With reference to FIG. 2, a seat post 72 of the bicycle (not shown) may include a head portion 74 supporting top and bottom clamping members 76 and 78, respectively, which are drawable towards each other by a fastener 80 or the like to clamp the seat rails 70 therebeteween. The clamping members 76 and 78 permit the seat rails and thereby the central member 12 and first and second side biased members 30 and 32 to be adjusted on the bicycle fore and aft. The bottom clamping member 78 may also include serrations 82 or other indexing means on the bottom surface thereof to permit the angle of the seat rails 70 to be adjusted.

In operation, a user (not shown) sits upon the apparatus 10 with their buttocks supported by each of the first and second side biased members 30 and 32 and the central member 12 therebetween. In such a manner, the central member 12 will be positioned towards the front of the bicycle (not shown) and be between the user's legs as they pedal. The weight of the user will cause the first and second side biased members 30 and 32 to be deformed in a downward direction generally indicated at 90 such that the first and second side biased members 30 and 32 exert a biasing force in an upward direction generally indicated at 106 in FIG. 2. In particular, the front edge 48 of the top portion 40 will be deflected downward to a greater degree than a rear of the first or second side biased members 30 or 32 so as to angle the top portion 40 forward as illustrated. Thus when in use as a user's weight shifts forward, the first and second biased members 30 and 32 flex or roll forward creating a biasing force to the underside of a user's leg. Similarly, in an upright riding position the first and second biased members 30 and 32 are allowed to return to their starting position resulting in supporting the user's sit bones. Thus it will be observed that a user's comfort can be adjusted depending upon their riding style. The material, thickness and width of the first and second side biased members 30 and 32 are chosen to provide a desired degree of deflection under the weight of a user. It will be appreciated that this degree of deflection may be selected to correspond to the weight of the rider as well as their personal preferences.

Figure 7:
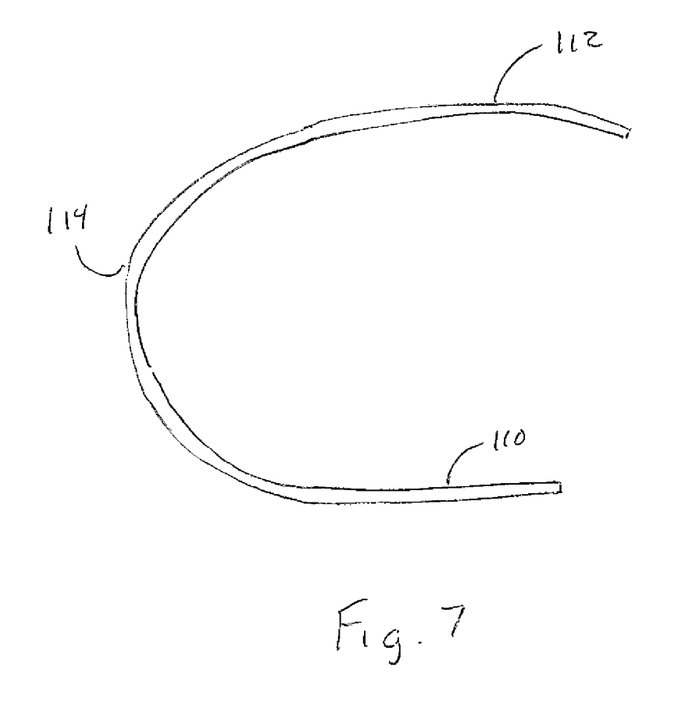
FIG. 7 is a side view of one of the biased side supports of the apparatus of FIG. 1 according to a further embodiment of the present invention.

Turning now to FIG. 7, an alternative embodiment of the present invention is illustrated in which the first and second side biased members 30 and 32 has a c-shaped profile. In the embodiment illustrated in FIG. 7, the first and second side biased members 30 and 32 are formed of a bottom portions 110, a top portion 112 with a bend 114 therebetween. The c-shaped first and second side biased members 30 and 32 may be formed in a similar manner and have similar dimensions for the top member 112 as the top member 40 for the s-shaped embodiment above.

While specific embodiments of the invention have been described and illustrated, such embodiments should be considered illustrative of the invention only and not as limiting the invention as construed in accordance with the accompanying claims.

What is claimed is:

1. An apparatus for supporting a bicycle rider comprising:
a pair of seat rails adapted to engage with and be supported by a bicycle seat post, each of said pair of seat rails having supporting a base member to opposed lateral sides thereof;
an elongate central member rigidly supported above said pair of seat rails;
first and second biased member each supported from said base member; and
first and second padded members supported by said first and second biased members each located to a lateral side of said central member and having a gap therebetween,
wherein said elongate central member extends longitudinally along said gap and is contained between said first and second padded members,
and wherein said padded members are each biased independently from each other and from said central member.

2. The apparatus of claim 1 wherein said first and second biased members have a curved top surface.

3. The apparatus of claim 2 wherein said top surface of said first and second biased members is positioned higher than a top surface of said central member.

4. The apparatus of claim 2 wherein said first and second biased members have an s-shaped profile.

5. The apparatus of claim 2 wherein said first and second biased members have a c-shaped profile.

6. The apparatus of claim 1 wherein said first and second biased members are formed of a material selected from the group consisting of metal, carbon fibre or plastic.

7. The apparatus of claim 1 further comprising a base member for connecting said first and second biased members to said central member.

8. The apparatus of claim 7 wherein said base member comprises a transverse member.

9. The apparatus of claim 1 wherein said central member includes at least one connecting member extending along a bottom surface thereof, said at least one connecting member being selectably connectable to a bicycle post along a length of said at least one connecting member.

10. The apparatus of claim 9 wherein said at least one connecting member comprises a pair of spaced apart rods.

11. The apparatus of claim 1 wherein said central member has a width of between 1 and 4 inches.

12. The apparatus of claim 1 wherein said central member has a padded layer therearound.

13. The apparatus of claim 1 wherein said pair of seat rails include an extended portion extending laterally therefrom to support said base members.

14. A method for supporting a bicycle rider comprising:
providing a pair of seat rails adapted to engage with and be supported by a bicycle seat post, each of said pair of seat rails supporting a base member to opposed lateral sides thereof;
rigidly supporting an elongate central member above said pair of seat rails; and
supporting first and second biasing members on said base members to each side of said central member; and
supporting first and second padded members on said first and second biasing members to opposed lateral sides of said central member so as to have a gap therebetween,
wherein said elongate central member extends longitudinally along said gap and is contained between said first and second padded members,
and wherein said padded members are each biased independently from each other and from said central member.

* * * * *